United States Patent [19]

Hattori et al.

[11] Patent Number: 4,705,492
[45] Date of Patent: Nov. 10, 1987

[54] AUTOMOTIVE INFINITE TRANSMISSION

[75] Inventors: Yoshiyuki Hattori, Toyoake; Ken Nomura, Okazaki; Takahiro Goshima, Kakamigahara; Hitoshi Tanaka, Obu, all of Japan

[73] Assignee: Nippondenso Co., Ltd., Kariya, Japan

[21] Appl. No.: 878,779

[22] Filed: Jun. 26, 1986

[30] Foreign Application Priority Data

Jun. 27, 1985 [JP] Japan .................................. 60-141244
Feb. 4, 1986 [JP] Japan .................................. 61-22450

[51] Int. Cl.⁴ .......................................... F16H 9/02
[52] U.S. Cl. ............................................. 474/49
[58] Field of Search ................................. 474/47–49, 474/8, 13, 69, 51, 54, 56

[56] References Cited

U.S. PATENT DOCUMENTS

| 439,535 | 10/1890 | Maxon | 474/56 |
|---|---|---|---|
| 2,341,076 | 2/1944 | Booth | 474/54 |
| 2,585,634 | 2/1952 | Deletaille | 474/54 |
| 3,720,113 | 3/1973 | Van Doorne et al. | 474/242 |
| 4,295,836 | 10/1981 | Kumm | 474/51 |
| 4,304,150 | 12/1981 | Lupo et al. | 474/13 X |
| 4,345,664 | 8/1982 | Anno et al. | 474/13 X |
| 4,608,034 | 8/1986 | Reswick | 474/49 |

FOREIGN PATENT DOCUMENTS

60-4661  1/1985  Japan .

Primary Examiner—Stephen J. Novosad
Assistant Examiner—Thuy M. Bui
Attorney, Agent, or Firm—Cushman, Darby & Cushman

[57] ABSTRACT

In an automotive infinite transmission, a rotation of an input pulley is transmitted to an output pulley through a belt in such a manner that a transmission ratio is continuously variable. Each of the input and output pulleys has a fixed pulley member fixedly mounted on a rotary shaft and a movable pulley member mounted on the rotary shaft for axial movement toward and away from the fixed pulley member. A tapered pulley surface of the fixed pulley member cooperates with a tapered pulley surface of the movable pulley member to define therebetween an annular groove having a generally V-shaped cross-section. A plurality of drive blocks are arranged between the pulley surfaces of the respective fixed and movable pulley members and circumferentially along the annular groove with the drive blocks being in sliding contact with the pulley surfaces. Provision is made between the drive blocks and the pulley surfaces in sliding contact therewith for reducing frictional forces. When the movable pulley member is moved axially relative to the fixed pulley member, the drive blocks are moved along generally radially extending slits formed in the tapered pulley surfaces of the respective movable and fixed pulley members. The drive blocks are biased radially inwardly against a centrifugal force due to the rotation of the movable and fixed pulley members.

5 Claims, 25 Drawing Figures

AUTOMOTIVE INFINITE TRANSMISSION

BACKGROUND OF THE INVENTION

The present invention relates to an automotive infinite transmission and, more particularly, to an improvement in drive blocks that are movable within effective diameters of pulleys.

In a conventional automotive infinite transmission, as shown in, for example, U.S Pat. No. 3,720,113, a V-belt is entrained around opposed inside surfaces of a pair of respective pulley members and one of the pair of pulley members is axially movable, so that the rotational position of the V-belt is continuously changed to enable the transmission ratio to be continuously varied.

In the infinite transmission of this type, since both sides of the V-belt must be held by the friction against the opposed inside surfaces or flanks of the pair of pulley members, it is impossible to excessively reduce the frictional coefficient of the sides of the V-belt. On the other hand, when the transmission ratio is desired to be changed, the V-belt must be slid in the radial direction along the confronted flanks of the pulley members in response to the axial movement of the one pulley member. Therefore when the transmission ratio is changed, considerably high pressure is applied to both the side faces of the V-belt. Thus, the conventional infinite transmission suffers a durability problem in the V-belt.

Also, in U.S. Pat. No. 4,295,836, there is proposed another infinite transmission in which a plurality of drive elements are interposed between a pair of guide disks each having therein spiral slits, and a flat belt are laid around and on the drive elements.

In the above U.S. patent, pins provided at both ends of each of the drive elements are engaged with the slits of the respective guide disks, and the pins are fixedly located at predetermined positions by changing the relative angular position between the pair of guide disks. Therefore, upon changing the transmission ratio, twist stresses will be applied to the pins, which causes the durability problem. Also, when the spiral slits are formed in the guide disks, a considerably high working or maching precision will have to be required.

OBJECT AND SUMMARY OF THE INVENTION

In view of the above-noted shortcomings inherent in the conventional infinite transmission, an object of the present invention is to provide an infinite transmission which is superior in durability as a whole and practical use.

According to the present invention, there is provided an automotive infinite transmission having an input pulley, an output pulley, and belt means entranined around the input and output pulleys for transmitting a rotatinal torque from the input pulley to the output pulley, an effective diameter of each of the input and output pulleys being variable for changing continuously a transmission ratio, each of the input and output pulleys comprising: a fixed pulley member fixedly mounted on a rotary shaft and having a tapered pulley surface; a movable pulley member mounted on the rotary shaft for movement axially of the rotary shaft and having a tapered pulley surface, the pulley surface of the movable pulley member cooperating with the pulley surface of the fixed pulley member to define an annular groove having a generally V-shaped cross-sectin; actuator means for axially moving the movable member toward and away from the fixed pulley member; a plurality of generally radially extending slits formed in each of the pulley surface of the fixed pulley member and the pulley surface of the movable pulley member; a plurality of drive blocks disposed circumferentially along the annular groove between the pulley surface of the fixed pulley member and the pulley surface of the movable pulley member, the drive blocks being in sliding contact with the respective pulley surfaces of the fixed and movable pulley members and being moved radially along the slits when the movable pulley member is mved toward and away from the fixed pulley member by the actuator means; means for reducing a frictional force between the drive blocks and the pulley surface of the fixed pulley member and a frictional force between the drive blocks and the pulley surface of the movable pulley member; means for biasing the drive blocks radially inwardly against a centrifugal force applied to the drive blocks when the fixed and movable pulley members are rotated; and the drive blocks each having a radially outward surface with which the belt means is in frictional contact Preferably, the transmission includes means mounted on each of the drive blocks for movement therewith and engaging corresponding at least one of the slits in the fixed pulley member and corresponding at least one of the slits in the movable pulley member, for guiding the movement of the drive block along the correspnding slits, the guide means being separate from the drive block.

Also, preferably, the infinite transmission includes groove means provided in one of the radially outward surface of each of the drive blocks and the belt means; and projection means provided in the other of the radially outward surface of the drive block and the belt means, for engaging the grooove means.

In the thus constructed infinite transmission, when the movable pulley member is moved toward the fixed pulley member upon change in speed, the drive blocks are moved radially outwardly. Since the frictional forces between the drive blocks and the respective pulley surfaces of the fixed and movable pulley members are made small by the frictional force reducing means, the forces applied to the drive block flanks are considerably low in comparison with the prior art. Also, any coompression force is not applied in the axial direction from the fixed and movable pulley members.

Also, although the drive blocks tend to be jumped radially outwardly due to the centrifugal force applied thereto, the drive blocks are forcibly retracted inwardly by the belt means where the drive blocks are in contact with the belt means, and the drive blocks out of contact with the belt means are attracted toward the radial position determined by the relative distance between the fixed and movable memembers, by the biasing means. Incidentally, it is appreciated that, since the centrifugal force of the pulley in the automotive infinite transmission is relatively small, the forces applid to the drive blocks need not be increased.

Also, since the belt means are wound around the drive blocks in a frictional transmission manner, circumferential forces are aplied to the drive blocks by the frictional force. However, the drive blocks are movable solely along the slits by the guide means engaged with pulley surface slits and mounted on the drive blocks. Therefore, the circumferential force applied to the drive blocks is transmitted to the pulley members through the guide means. Also, the rotation of the pulley members are transmitted to the drive blocks through the guide means. Thus, a large force is applied to each guide means. If the drive blocks and the guide means are separately machined, the respective machining precisions would be enhanced.

The guide means may be in the form of a generally cylinder. In this case, the contact area between the slit inner walls and the guide means is reduced, thereby reducing the friction force therebetween.

The groove means and associated projection means serve to increase the friction area and the friction with a wedge effect. Furthermore, in accordance with another specific aspect of the present invention, the drive blocks are moved radially in response to the axial movement of the movable pulley member and, at the same time, since the pulley surface is in the form of a taper, the drive blocks are slightly moved in the aixal direction. The aixal movement causes the axial forces to be applied to the belt means. Then since the belt means and drive blocks are engaged with each other by the groove means and projection means, the axial force is effective to increase the friction between the groove means and projection means.

DETAILED DESCRIPTION

Various embodiments of the present invention will now be described with reference to the accompanying drawings, in which same or like reference numbers and characters are used to designate like or similar parts or components, and the description of such like pparts and components will therefore be omitted to avoid repetetion and for simplification.

Figure 1:
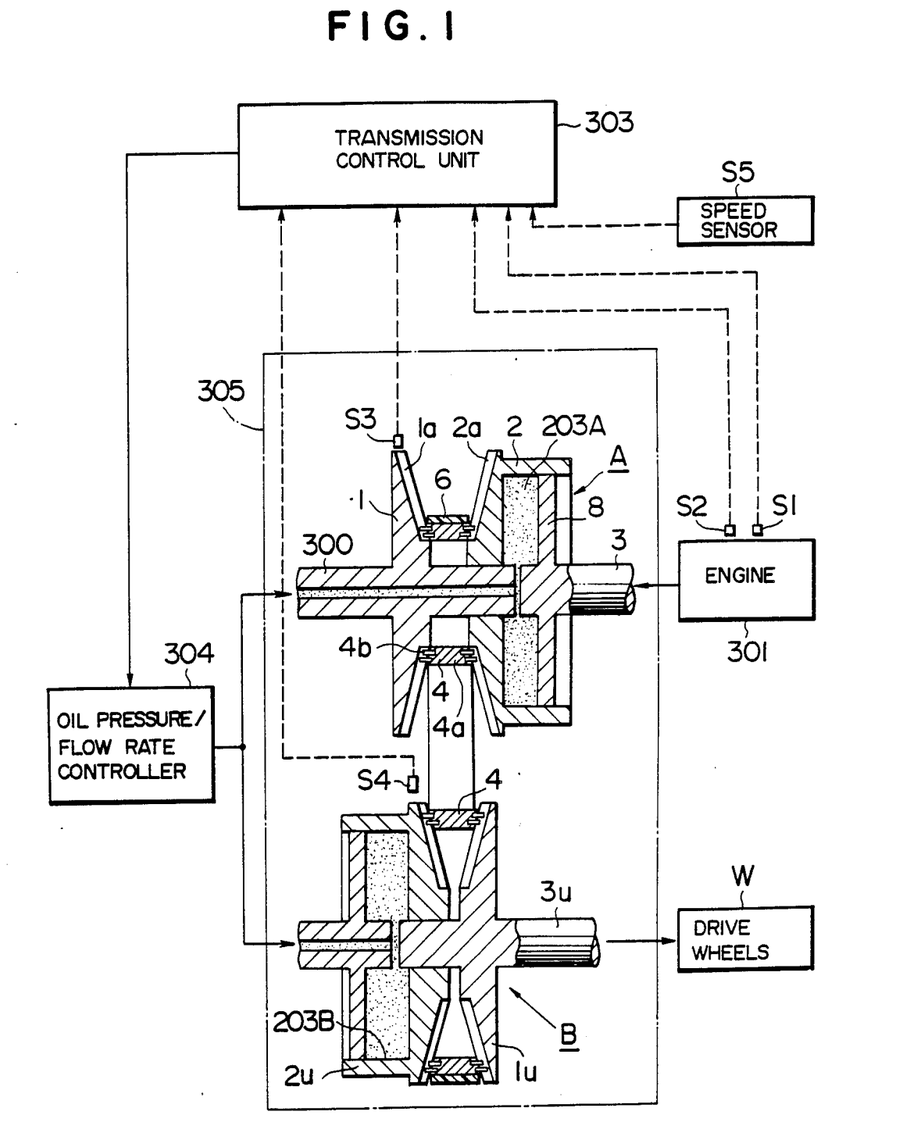
FIG. 1 is a schematic cross-sectional view showing an entire autmotive transmission system of the present invention.

FIG. 1 shows an automotive infinite transmission 305 in accordance with the present invention and an entire control system for controlling the infinite transmission. An input shaft 3 of an input pulley A of the transmission 305 is connected to an automotive engine 301 through an electro-magnetic clutch (not shown).

The infinite transmission 305 has a pair of V-groove pulley members 1 and 2 constituting the input pulley A, a pair of V-groove pulley members $1u$ and $2u$ constituting an output pulley B, a plurality of drive blocks 4 that are movable in a radial directin along the V-grooves, and an endless belt 6 that is laid around the drive blocks 4. The fixed pulley member 1 of the input pulley A is fixedly mounted on the input shaft 3. The other movable pulley member 2 is axially slidably mounted on the rotary shaft 3 toward and away from the fixed pulley member 1. On the opposite side of the movable pulley member 2 from the endless belt 6, there is formed an oil pressure chamber 203A which functions to cause the movable pulley member 2 to slide axially. A diameter of the input pulley A that is defined by the pulley members 1 and 2 is variable in accrdance with the oil that is introduced into the oil chamber 203A.

On the other hand, the fixed pulley member $1u$ of the output pulley B is fixed to an output shaft $3u$ connected to drive wheels W. The movable pulley member $2u$ of the output pulley B is mounted on the output shaft $3u$ for axial sliding, i.e., toward and way from the fixed pulley $1u$. On the opposite side of the movable pulley member $2u$ from the endless belt 6, there is formed an oil pressure chamber 203B which functions to cause the movable pulley member $2u$ to slide axially. A diameter of the output pulley B that is defined by the pulley members $1u$ and $2u$ is variable in accordance with the oil that is introduced into the oil pressure chamber 203B. Specifically, the diameters of the input and output pulleys A and B are controlled by controlling the pressure oil that is introduced into the oil pressure chambers 203A and 203B, whereby a gear ratio e (e=input pulley rpm $N_{IN}$/output pulley rpm $N_{OUT}$) may be selected as desired. The pressure oil to be introduced into the respective oil pressure chambers 203A and 203B is controlled by a flow controller 304 composed of flow rate control valves, pressure control valves and the like.

The engine 301 is provided with a throttle opening degree sensor S1 and an engine RPM sensor S2. The input pulley A of the infinite transmission 305 is provided with an input pulley RPM sensor S3 for detecting an RPM of the fixed pulley member 1, and the output pulley B is provided with an output pulley RPM sensor S4 for detecting an RPM of the movable pulley member 2u. A vehicle speed sensor S5 for detecting the vehicle speed, as well as the above-described sensors, is connected to a transmission control unit 303 composed of a micro-computer. The transmission control unit 303 computes a target transmission ratio of the infinite transmission on the basis of the outputs from the throttle opening degree sensor S1, engine RPM sensor S2 and vehicle speed sensor S5. Subsequently, the control unit computes the transmission ratio e on the basis of the outputs of the input and output pulley RPM sensors S3 and S4. The control unit 303 coompares the transmission ratio l with the target transmission ratio, thereby producing an output signal for an oil pressure/flow rate controller 304 so that the measured transmission ratio l approaches the target transmission ratio. The oil controller 304 serves to control suitably the oil pressure and flow rate in the oil pressure chambers 203A and 203B in accordance with the output signal of the transmission control unit 303.

An explanation will be made as a specific structure of the infinite transmission 305. In view of the fact that, in the structure shown, the input pulley A and the output pulley B are constructed in the same manner, a specific structure of the input pulley A will solely be expalined and a detailed explanation of the output pulley structure will be omitted.

Figure 2:
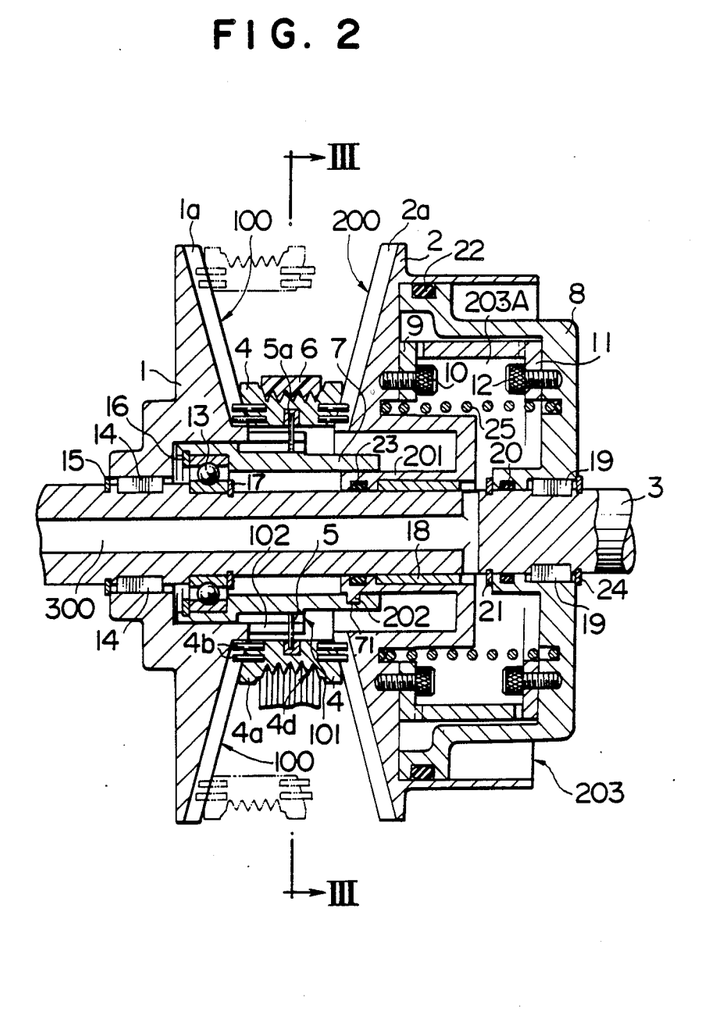
FIG. 2 is a cross-sectional view of an input pulley in a first embodiment of the invention.
Figure 3:
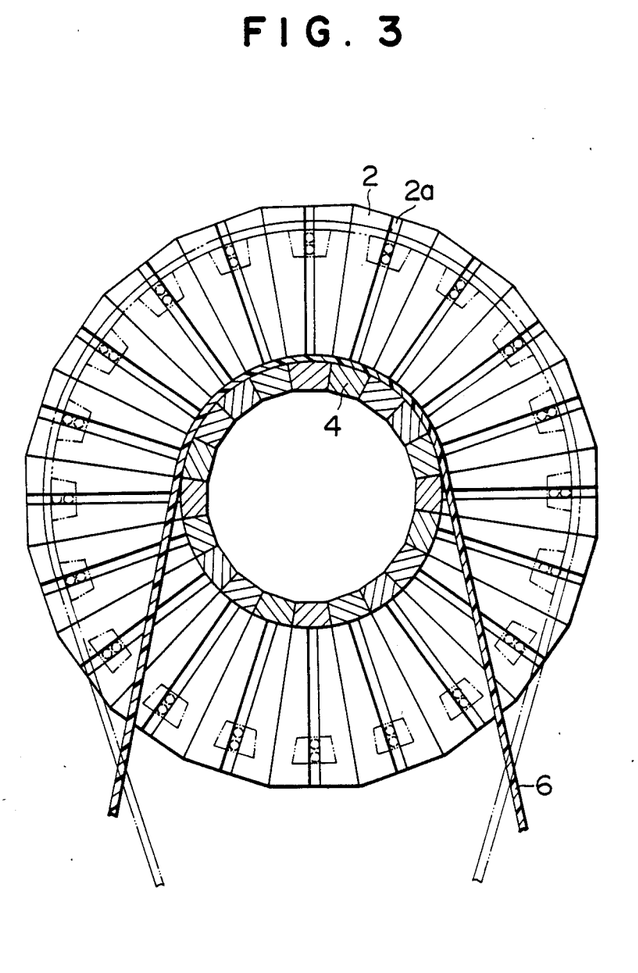
FIG. 3 is a cross-sectional view taken along the line III—III of FIG. 2.

Referring now to FIGS. 2 to 10, an infinite transmission according to a first embodiment of the present invention will be described. FIG. 2 shows a detailed cross-sectional view of the input pulley. FIG. 3 shows a cross-sectional view taken along the line III—III of FIG. 2.

The fixed pulley member 1 is made of ferric alloy and is formed into a polygonal truncated cone (20-angle cone in the embodiment). A number of radially extending, linear slits or grooves 1a are formed in a pulley surface 100. The pulley surface 100 and the linear slit flanks are subjected to a carburizing treatment as a surface hardening process. Furthermore, these surfaces are ground so as to have good surface rooughness. The fixed pulley member 1 is mounted on the shaft 3 by keys 14 and a circlip 15 against rotation and axial movement relative thereto.

On the other hand, in a movable pulley unit 203, a fixed flange 8 is fixed to the shaft 3 by keys 19 and circlips 21 and 24 and is sealingly mounted to the shaft 3 through an O-ring 20. The movable pulley member 2 having a pulley surface 200 is mounted axially movably on the shaft 3. The movable pulley member 2 is made of ferric alloy and is formed in a polygonal truncated cone (20-angle cone in the embodiment). In the same manner as in the fixed pulley member 1, a number of radial bottomed linear slits or grooves 2a are formed in the pulley surface 200 of the movable pulley member 2 as shown in FIG. 3. Also, the pulley surface 200 and both the flanks of each linear slit are subjected to a carburising treatment and a grinding process as in the fixed pulley member 1. A cam member 9 is fixed to the movable pulley member 2 by bolts 10. Another cam member 11 is fixed to the fixed flange 8 by bolts 12. Concave and convex portions of the two cam members 9 and 11 are alternatively arranged so that the movable pulley 2 and the fixed flange 8 are axially movable relative to each other but are not movable circumferentially relative to each other. More specifically, an O-ring 23 and a dry bearing 18 are provided on a sliding surface between the movable pulley member 2 and the shaft 3, and an O-ring 22 is provided on the fixed flange 8 side on a sliding surface between the fixed flange 8 and the movable pulley member 2, so that the movable pulley member 2 and the fixed flange 8 may readily be slid as desired relative to each other. A spring 25 has one end at the fixed flange 8 side and the other end at the movable pulley member 2 side, to thereby normally bias the movable pulley member 2 toward the fixed pulley member 1.

Figure 4:
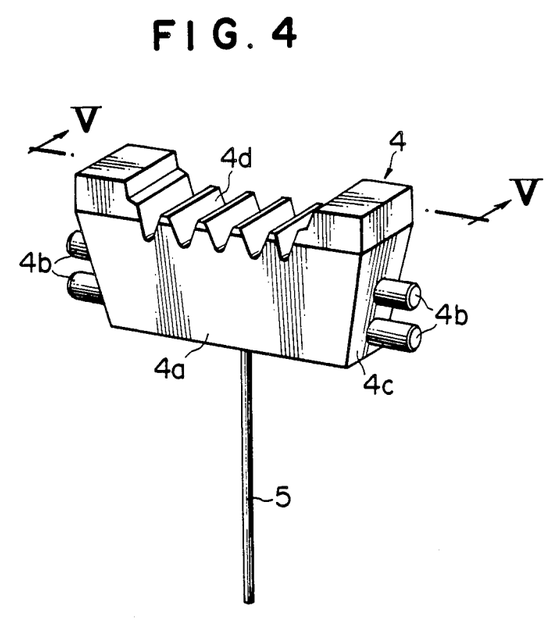
FIG. 4 is a perspective view of a drive block shown in FIG. 2.
Figure 5:
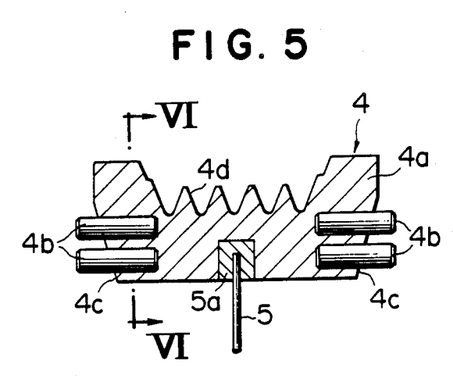
FIG. 5 is a cross-sectional view taken along the line V—V of FIG. 4.
Figure 6:
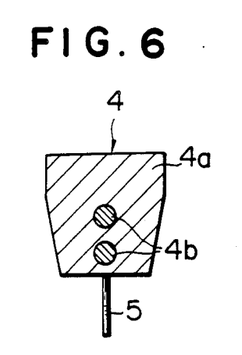
FIG. 6 is a cross-sectional view taken along the line VI—VI of FIG. 5.

A detailed explanation will be made as to the drive blocks 4 in the first embodiment referring to FIGS. 4 to 6. FIG. 5 is a cross-sectional view taken along the line V—V of FIG. 4. FIG. 6 is a cross-sectional view taken along the line VI—VI of FIG. 5. The number of drive blocks 4 are movable solely in the radial direction along the slits 1a and 2a by guide means such as four pins 4b. Each of the drive blocks 4 is constructed so that V-grooves 4d are formed in a surface of the drive block 4 in frictional contact with the belt 6, holes for fitting engagement with the pins 4b are formed in surfaces 4c, and cylindrical pins 4b are pressingly inserted into a drive block body 4a whose surfaces 4c are subjected to a surface treatment as means for reduction of the frictional force.

Portions of the respective pins 4b to be located in the slits 1a and 2a are ground to reduce a frictional force between the slits 1a and 2a and the pins 4b. The four pins 4b projecting from the drive block body 4a are fixed to be aligned in the same plane with a high precision. Namely, the center axes of the respective four pins are alinged within a plane including a rotary axis of the pulley.

It is preferably that the drive block body 4a be made of a material having a rigidity and a light weight. The material may be selected from metals, composite material such as FRMs or FRPs and ceramics. The guide members, that is, pins 4b are subjected to a circumferential force exerted to the drive block 4 and the slits 1a and 2a. Therefore, it is preferable that the pins 4b be made of a material having a high shearing-force resistance, a rigidity and a light weight. The material for the pins 4b may be selected from a variety of materials as in the block body 4a. In the embodiment, the pins 4b are made of steel.

The surface of the drive block 4 in frictional contact with the belt 6 is formed with a number of V-grooves 4d forming friction increasing means, so as to extend in parallel to the belt 6. Also, a number of V-projections which are in mesh with the V-grooves 4d are formed in the belt 6.

Figure 7:
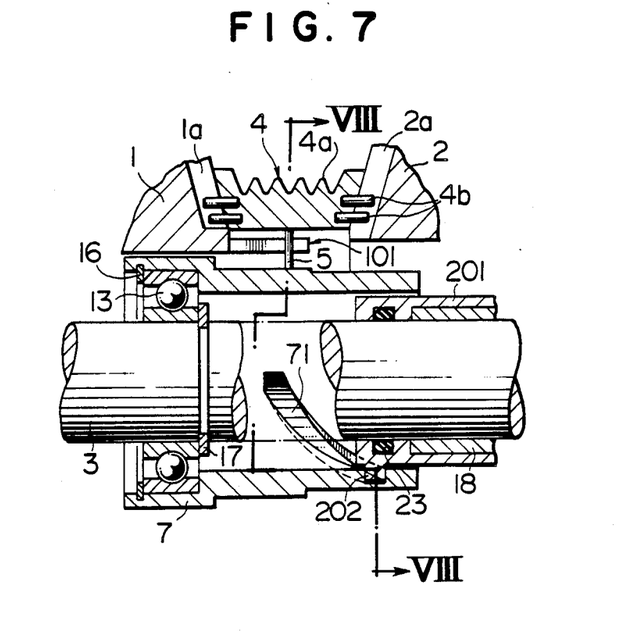
FIG. 7 is a partially broken-away, fragmentary enlarged cross-sectional view of FIG. 2, with the drive block occupying its minimum diameter position.
Figure 8:
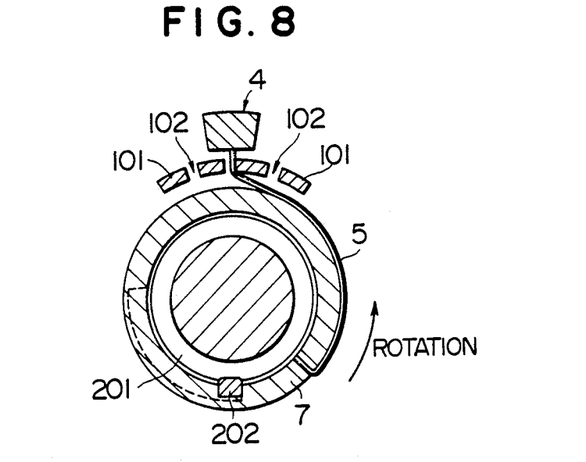
FIG. 8 is a cross-sectional view taken along the line VIII—VIII of FIG. 7.

A tension wire 5 such as a piano wire (diameter is 0.5 to 1 mm) is fixed at one end to each drive block 4, for example, by press-fitting with powders 5a (see FIG. 5). As best shown in FIG. 8, the tension wire 5 extends through wire slit 102 corresponding in number to the linear slits 1a in a flanged portion 101 of the fixed pulley member 1, and the other end of the tension wire 5 is fixed, by press-fitting or the like, to a tension rotor 7. The tension rotor 7 is mounted on the shaft 3 by a bearing 13 and circlips 16 and 17 so that the tension rotor 7 is rotatable but fixed in the axial direction. The tension rotor 7 is radially spaced from the fixed pulley member 1. A spiral square groove, that is, lead groove 71 is formed in the inner surface of the tension rotor 7 as shown in FIG. 7. Engaged with the lead groove 71 is a cylindrical projection 202 that is provided at an end of the flange 201 on the inner peripheral side of the movable pulley member 2 and has substantially the same width as that of the lead groove 71. A pressure oil supply passage 300 is formed in the shaft 3 for moving the movable pulley member 2. The pressure oil passage 300 is in fluid communication with the pressure oil chamber 203A defined between the movable pulley 2 and the fixed flange 8 of the movable pulley unit 203.

The operation of the automotive infinite transmission 305 in accordance with the first embodiment will be explained. In FIG. 1, the input shaft 3 is rotated together with the engine 301. The output pulley B is rotated together with the output shaft 3u that is fixedly connected to a differential gear (not shown). The torque transmission from the input pulley A to the output pulley B is performed through the flat belt 6 laid between the two pulleys. The RPMs of the two pulleys are determined by the effective diameter of the flat belt 6. The effective diameter is determined by the radial positions of the respective drive blocks 4 clamped in the V-groove defined between the fixed pulley members 1 and 1u and the movable pulley members 2 and 2u. The movable pulleys 2 and 2u serve to restrict the radial movement of the drive blocks 4. More specifically, in order to increase the belt effective diameter of the input pulley A, the pressurized oil (oil pressure is 20 to 30 kg/cm$^2$) fed by an oil pump driven by the pressure oil controller 304 is introduced through the oil supply passage 300 of the input shaft 3 into the sealed oil chamber 203A defined by the fixed flange 8 and the movable pulley member 2, so that the movable pulley member 2 is moved toward the fixed pulley member 1, thus reducing the space between the fixed pulley member 1 and the movable pulley member 2. Therefore, the drive blocks 4 are moved radially outwardly to increase the effective diameter of the belt 6.

At this time, on the output pulley B side, the belt 6 tends to reduce its effective diameter. If the oil pressure within the pressure oil chamber 203B is reduced, the drive block 4 is pressed radially inwardly. As a result the movable pulley member 2u is moved away from the fixed pulley member 1u so that the oil in the pressure oil chamber 203B of the output pulley B is released. Accordingly, the diameter of the belt 6 is reduced in response to the increase of the diameter of the output pulley A. Thus the transmission ratio of the infinite transmission 305 may readily be changed by charging and discharging the pressurized oil into and from the pulleys (20 to 30/min at maximum in terms of a flow rate). It is also to be noted that the drive blocks 4 and the pulley surfaces 100 and 200 are come into surface contact with each other because the pulley is in the form of a polygonal cone, so that an excessive force would not be applied locally to a part of each drive block 4. Furthermore, since the contact surfaces are sufficiently smooth and have a low frictional coefficient by the grinding process, the frictional resistance between the drive blocks 4 and the pulley surfaces 100 and 200 is low. Accordingly, the pressure force (pulley propelling force) for pressing the movable pulley member 2 relative to the fixed pulley memebr 1 may be made small for moving the drive blocks 4 radially. Namely, the supply pressure of the oil may be made small. This means that, since the transmission force between the pulleys depends upon the frictional force between the belt 6 and drive blocks 4 to be described later, the smaller the frictional coefficient between the drive blocks 4 and the pulley surfces 100 and 200, the smaller the pulley propelling force, i.e., supply oil pressure will become in transmitting, a necessary torque between the pulleys. This leads to high compactness and reliability of the system. As shown in FIG. 2, the oil within the pulley is sealed by O-rings 20, 22 and 23 provided on the fixed flange 8 and the movable pulley member 2.

The transmission of the torque will be described with reference to FIGS. 1 and 2. The rotational torque from the engine 301 is transmitted to the fixed pulley member 1 through the input shaft 3 and the keys 14 and is further transmitted to the fixed flange 8 through the keys 19. The torque from the fixed flange 8 is further transmitted to the movable pulley member 2 through the cam members 11 and 9. The torque is further transmitted to the drive blocks 4 through the respective linear slits 1a and 2a of the fixed and movable pulley members 1 and 2 and the guide members, i.e., pins 4b, so that the frictional force between the drive blocks 4 and the belt 6 causes a tension to be generated in the belt 6, thus drivingly rotating the output pulley B.

As the torque is transmitted, a shearing force is generated between the parts of the pins 4b within the drive blocks 4 and the parts of the pins 4b inserted into the slits. However, the pins 4b are made of steel and sufficiently withstand the stress caused by the shearing force.

An explanation of the torque transmission in the output pulley B will be omitted since the torque transmission pass thereof is the same as that of the input pulley A. It should be noted, however, that since the invention is characterized in that the torque is transmitted by the frictional force between the belt 6 and the drive blocks 4, the transmission efficiency and the durability of the belt is considerably improved in comparison with the conventional steel belt.

Referring now to FIGS. 2 through 10, the operation of the drive blocks 4 will be described in detail. As shown in FIG. 2, the drive blocks 4 are moved radially along the linear slits 2a on the pulley surface 200 in accordance with the axial movement of the movable pulley member 2. Of the drive blocks 4, ones around which the belt 6 is laid are subjected to the radially outward forces caused by the propelling force from the movable and fixed pulley members and the centrifugal force caused by the rotation of the pulley, thus producing the frictional force between the drive blocks and the belt. Thus, the drive blocks around which the belt is wound are used as the components for the torque transmission. However, the remaining drive blocks 4 that are out of contact with the belt 6 are liable to be jumped radially outwardly by the above-described forces. Therefore, a mechanism is required for always pulling the drive blocks toward the center of the pulley. In the first embodiment, the drive blocks 4 are always pulled toward the center by the tension wires 5, thereby preventing the jumping-out of the drive blocks 4.

Figure 9:
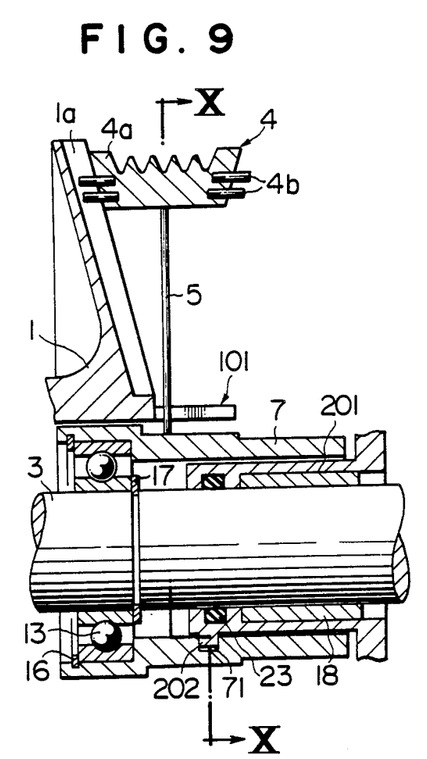
FIG. 9 is a partially broken-away, enlarged cross-sectional view of FIG. 2, with the drive block occupying its maximum diameter position.
Figure 10:
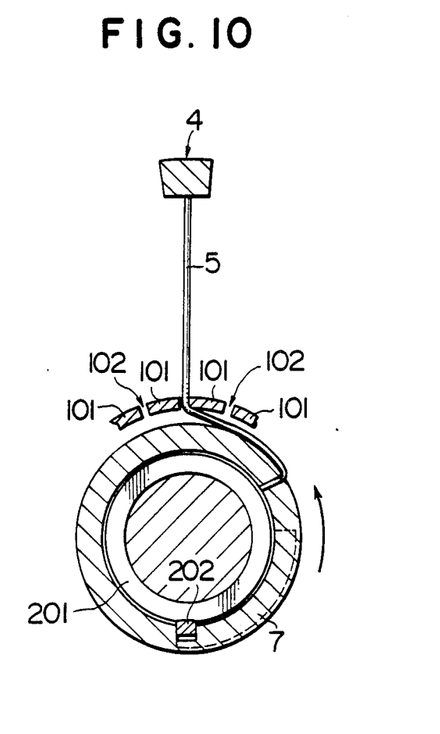
FIG. 10 is a cross-sectional view taken along the line X—X of FIG. 9.

FIGS. 7 and 8 show the state that the drive block 4 is located at the radial innermost position. The tension wire 5 connected to the drive block 4 is wound around the tension rotor 7 through the wire slit 102 of the flanged portion 101. When the movable pulley member 2 is moved toward the fixed pulley member 1 to move the drive block 4 radially outwardly from the position shown in FIG. 7, the tension rotor 7 is rotated in the direction, indicated by the arrow in FIG. 8, by the cooperation of the spiral lead groove 71 with the cylindrical projection 202 formed at the end of the flanged portion 201. The tension wire 5 is unwound from the tension rotor 7 in accordance with the radially outward movement of the drive block 4. In response to the axial movement of the movable pulley member 2, the position of the cylindrical porjection 202 is determined and the angular position of the tension rotor 7 is determined. Thus, the length of the tension wire 5 may be adjusted. FIGS. 9 and 10 show the state in which the drive block 4 reaches the radial outermost position. The tension rotor 7 is angularly moved through approximately 90 degrees from the position shown in FIG. 8, and the angle through which the tension rotor 7 is angularly moved is determined by the stroke of the drive block 4 and the wire wrapping diameter of the tension rotor 7.

It should be noted that the slits 102 formed in the flanged portion 101 of the fixed pulley member 1 have effects to guide the wires 5 so that the drive block 4 may be moved while being always pulled toward the center of the pulley.

As described above, in the first embodiment, the centrifugal force applied to the drive block 4 is restricted by the tension wire 5 and the transmission of the torque is attained through the pins 4b and the frictional force between the belt 6 and the drive block 4.

The force for pressing the drive blocks radially inwardly by the belt tension and the force for pressing the drive blocks 4 axially of the pulley in accordance with the movement of the movable pulley member 2 are applied to the surfaces 4c of the drive blocks 4. The transmission of the torque between the drive blocks 4 and the pulley members 1 and 2 is attained by the pins 4b.

According to the first embodiment, the action forces are thus dispersed unlike the conventional drive elements as shown in U.S. Pat. No. 4,295,836 in which all the action forces are applied to the pins of the drive elements. It is sufficient to make efforts as to how smoothly the drive blocks are moved along the linear slits. Accordingly, it is possible to moderate the necessary working precisions of the drive blocks 4, the pulley surfaces 100 and 200 of the fixed and movable pulleys 1 and 2 and the slits 1a and 2a therefor. Thus, the durability of the components may be enhanced.

Figure 11:
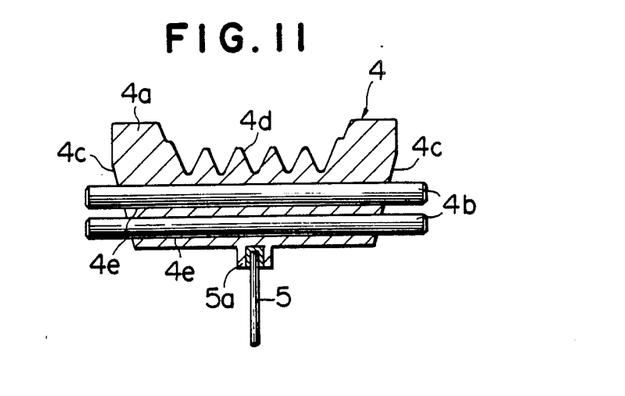
FIG. 11 is a cross-sectional view of a drive block in accordance with a second embodiment.

A second embodiment of the present invention will now be described with reference to FIG. 11. As shown in FIG. 11, through holes 4e are formed in each drive block body 4a, so that the guide members, that is, pins 4b extend through the through holes 4e. Except for this structure, the system according to the second embodiment is the same as that of the first embodiment.

According to the second embodiment, substantially the same effect as that of the first embodiment may be obtained. It is to be noted that, in the first embodiment, the pins 4b projecting from the two surfaces 4c of the drive block 4 must be aligned with each other in a single plane in parallel to slits 1a and 2a along which each drive block 4 is moved. Otherwise, non-uniform forces would be applied to the respective pins 4b so that some pins would be subjected to large forces or alternatively, strain stresses such as twists would be generated in the drive block 4. Therefore, the positioning of the pins 4b, that is, the machining of the holes with which the pins 4b are engaged needs high mechanical precisions. However, in the second embodiment, since the pins 4b projecting from the two surfaces 4c extend through the block, all the pins projecting from the flanks may be arranged in a single plane with high accuracies. Furthermore, the structure of the second embodiment may assist the rigidity of the drive block 4.

Figure 12:
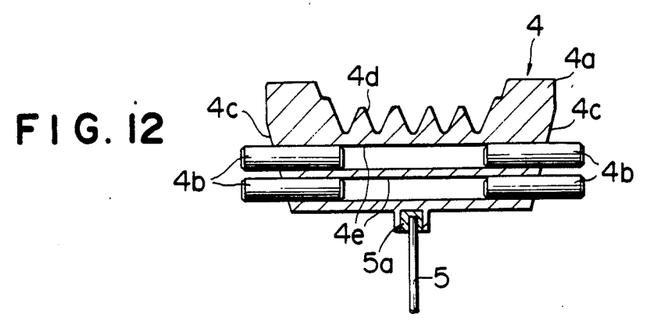
FIG. 12 is a cross-sectional view of a drive block in accordance with a third embodiment.

Also, in a third embodiment of the invention as shown in FIG. 12, the guide members, that is, pins 4b are inserted into the through holes 4e of the drive block 4 from both sides, thereby obtain the same effect as that of the first and second embodiments. In this case, the drive block 4 may be made light in weight.

Figure 13:
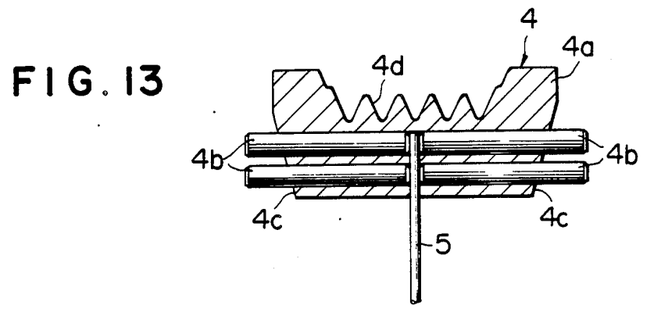
FIG. 13 is a cross-sectional view of a drive block in accrodance with a fourth embodiment.

Also, in a fourth embodiment shown in FIG. 13, a tension wire 5 is caused to project into the central portions of the through holes 4e of the drive block 4, and is clamped from both sides by the pins 4b, in order to obtain substantially the same effect as that of the first and second embodiments. With such a structure, the press-fitting portion of the tension wire 5 with the powder 5b may be dispensed with.

Figure 14:
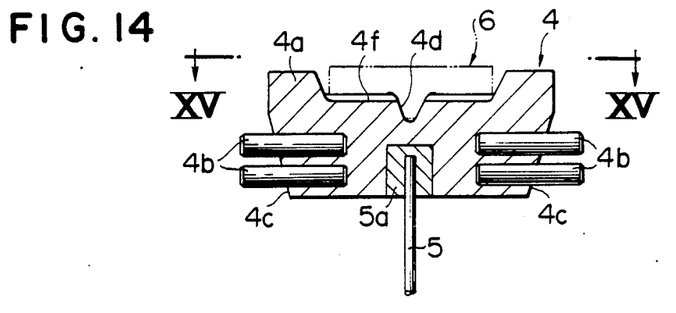
FIG. 14 is a cross-sectional view of a drive block in accordance with a fifth embodiment.
Figure 15:
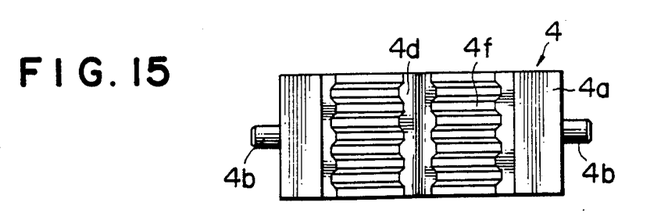
FIG. 15 is a top plan view of the drive block of the fifth embodiment as viewed in the direction of the arrows XV—XV in FIG. 14.

A fifth embodiment of the present invention will now be described with reference to FIGS. 14 and 15. In the fifth embodiment, grooves 4d parallel to the belt 6 and grooves 4f perpendicular to the belt 6 are formed in the surface of the drive block 4 in frictional contact with the belt 6. Also, the belt 6 has associated projections that engage with these grooves 4d and 4f. Except for this structure, the fifth embodiment is the same as the first embodiment in structure.

With such an arrangement, the frictional force between the drive block 4 and the belt 6 is enhanced, and at the same time, the torque transmission efficiency between the drive blocks 4 and the belts 6 is enhanced.

The guide members, that is, pins 4b used in the second through fifth embodiments are arranged as shown in FIG. 6.

Figure 16:
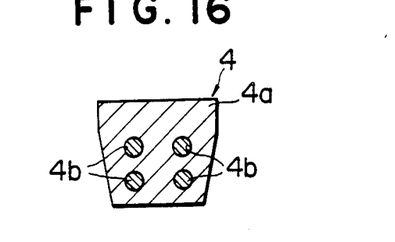
FIG. 16 is a cross-sectional view of a drive block in accordance with a sixth embodiment.

In a sixth embodiment shown in FIG. 16, each guide member is composed of four pins 4b fixed to each of the axial opposing end faces of the associated drive block 4. The four pins 4b may be engaged with the associated single slit, or otherwise a first pair of upper and lower pins 4b and the other pair of upper and lower pins 4b may be, respectively, engaged with corresponding one pair of adjacent slits.

Figure 17:
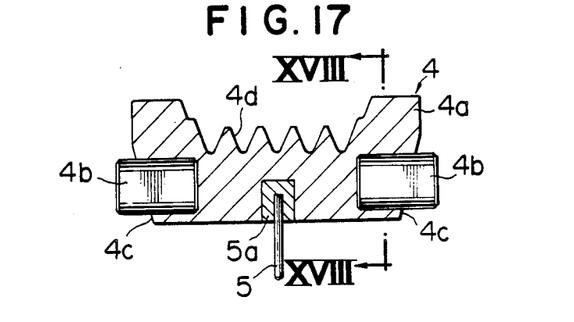
FIG. 17 is a cross-sectional view of a drive block in accordance with a seventh embodiment.
Figure 18:
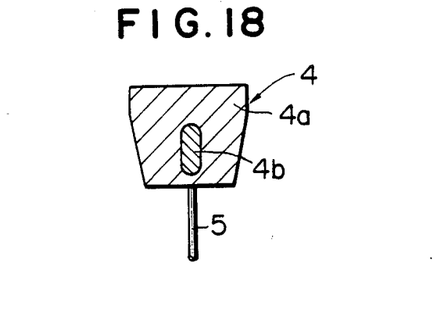
FIG. 18 is a cross-sectional view taken along the line XVIII—XVII of FIG. 17.

Also, in a seventh embodiment shown in FIGS. 17 and 18, a pin 4b has an oblong cross-section.

Thus, the guide members, that is, pins 4b also serve to prevent the drive block from separating away from the slits 1a and 1b and rotating or rolling. It is apparent that the shape of the pins 4b is not limited to the cylindrical one.

Figure 19:
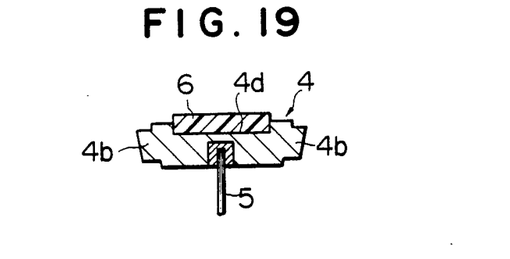
FIG. 19 is a cross-sectional view of a drive block in accordance with an eighth embodiment.

FIG. 19 shows a drive block 4 used in an eighth embodiment of the invention. A groove 4d having substantially the same width of that of the belt 6 is formed in the radially outward surface of the block 4, that is, the surface with which the belt 6 is brought into frictional contact. The bottom of the groove 4d may be flat or otherwise may be arcuate.. The bottom may be knurled so as to enhance the frictional coefficient. The axial movement of the flat belt 6 caused by a possible misalignment in accordance with the effective diameter change of the belt is restricted by means of the groove 4d formed in the frictional surface between the drive block 4 and the flat belt 6, thus further improving the durability of the belt 6. Also, in the eighth embodiment shown in FIG. 19, the guide members, that is, pins 4b are formed integrally with the drive block 4.

Figure 20:
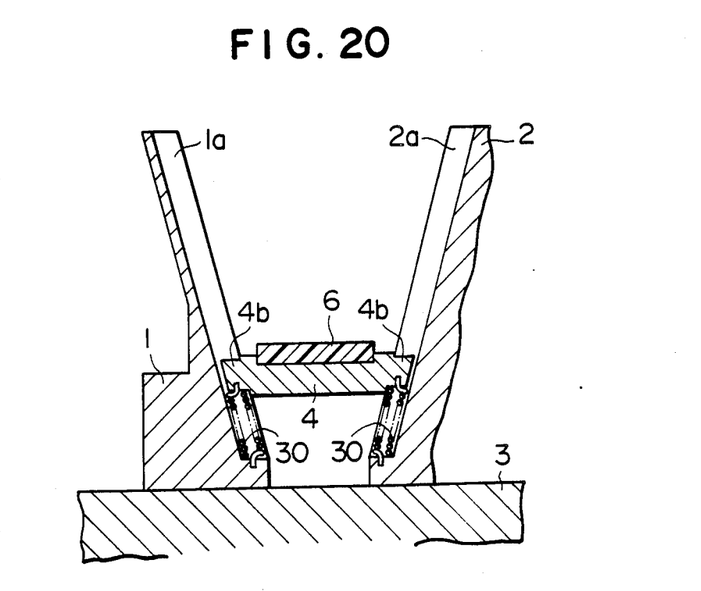
FIG. 20 is a fragmental cross-sectional view of an input pulley when a drive block is located at a minimum diameter position, in accordance with a ninth embodiment.
Figure 21:
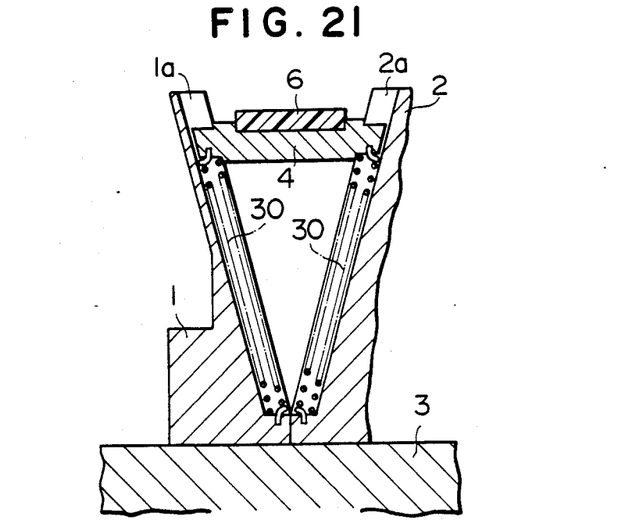
FIG. 21 is a cross-sectional view of the drive block when it is located at a maximum diameter position.

In the first through eighth embodiments shown in FIGS. 2 through 19, as the mechanism for pulling the drive blocks 4 radially inwardly, the tension wire 5 is utilized to pull the drive blocks 4 by the use of the rotation of the tension rotor 7. In contrast thereto, in a ninth embodiment, as shown in FIGS. 20 and 21, for example, a tension spring (material is SWPA) 30 is arranged within the respective linear slits 1a and 2a of the fixed pulley member 1 and the movable pulley member 2. FIG. 20 shows a state of minimum pulley diameter and FIG. 21 shows a state of maximum pulley diameter. In this case, the tension force of the spring 30 causes the drive block 4 to be normally urged radially inwardly, thus prevention the drive block 4 from being jumped to the outside due to the centrifugal force.

Figure 22:
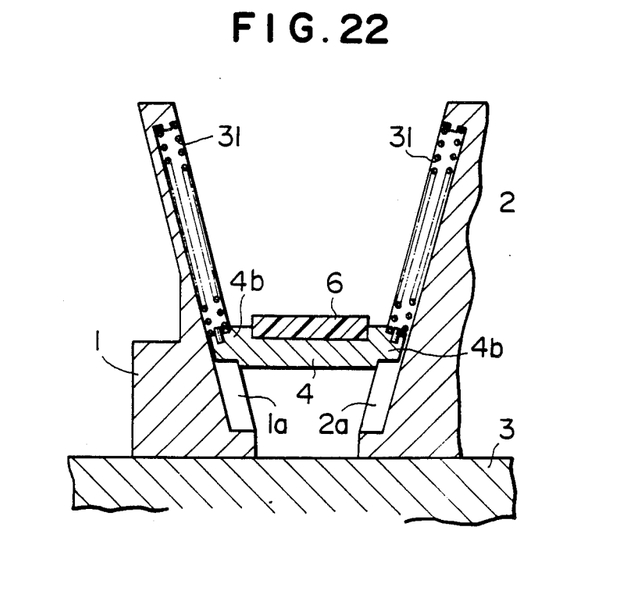
FIG. 22 is cross-sectional view of a drive block in accordance with a tenth embodiment.

Also, as shown in FIG. 22 showing a tenth embodiment of the invention, compression coil spring 31 may be used each of which is disposed in corresponding one of the slits 1a and 2a in the respective fixed and movable pulley members 1 and 2, so that the expansion force of the compression coil spring 31 may cause the drive block 4 to be always urged radially inwardly.

Figure 23:
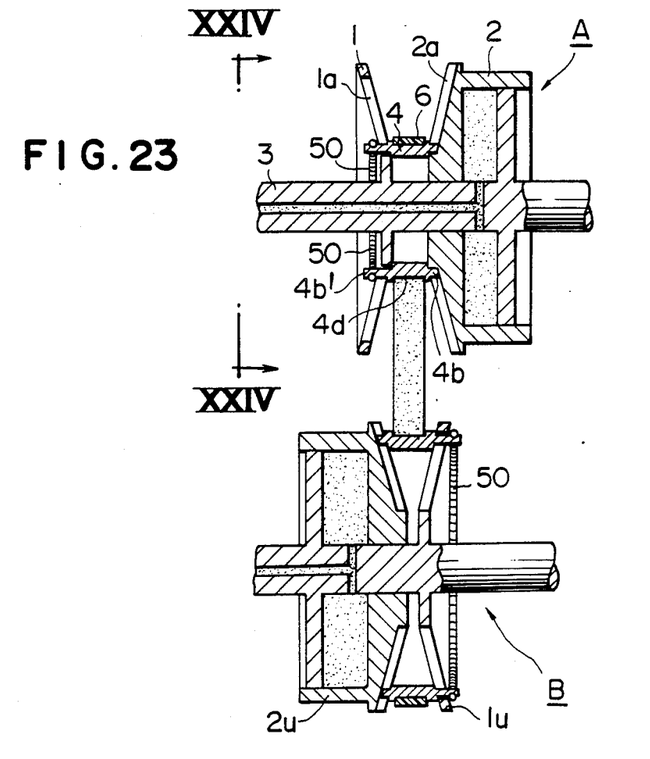
FIG. 23 is a cross-sectional view of an infniite transmission in accordance with an eleventh embodiment of the ivention.
Figure 24:
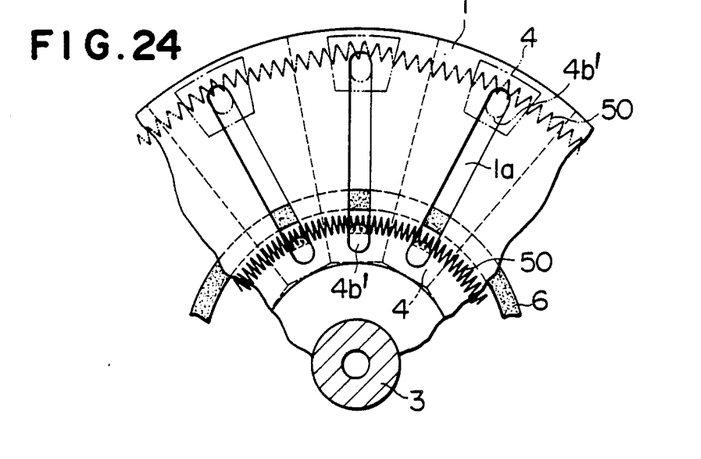
FIG. 24 is a fragmental enlarged view as viewed in the direction indicated by the arrows XXIV—XXIV of FIG. 23.

An eleventh embodiment of the invention applied to an infinite transmission 305 will now be described with reference to FIGS. 23 and 24. Also with respect this embodiment, since the input and output pulleys A and B have the same structure as in the foregoing embodiments, an explanation will be made as to the input pulley A solely. The linear slits 1a are of the through-slit type. Pins 4b' of the drive blocks 4 extend through the respective linear slits 1a and are engaged therewith. An endless elastic member 50 made of rubber or the like is entrained around pins 4b', so that the drive blocks 4 are always urged toward the center of the pulley. In other words, as shown in FIG. 24, the shrink force of the elastic member 50 is always applied to the blocks 4 so that the blocks 4 are moved radially inwardly in the minimum diameter state and the maximum diameter state (indicated by two-dot-and-dash lines). Thus, the drive blocks 4 may be prevented from jumping away from the pulley due to the centrifugal force.

Figure 25:
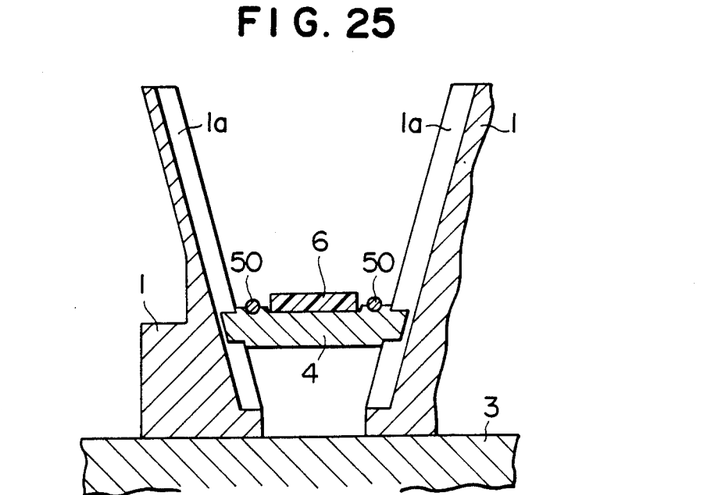
FIG. 25 is a cross-sectional view of an infinite transmission in accordance wih a modification of the eleventh embodiment.

As a modification of the eleventh embodiment, as shown in FIG. 25, elastic members 50 made of rubber or the like in the form of a ring are wound around the drive pulleys 4 at respective positions which do not interfere with the belt 6 and the drive blocks 4, to urge the latter radially inwardly. In this case, the like effect may be ensured.

The elastic member 50 may be a ring made of an endless coil spring or in combination made of rubber and coil spring instead of the rubber loop. Namely, the elastic member may be made of material that expands and shrinks in accordance with the diameter change of the drive block 4.

In the foregoing embodiments, the fixed pulley member 1 and the movable pulley memebr 2 may be made of FRM or high tension aluminum alloy instead of the ferric alloy. Also, any desired surface hardening treatment such as hard chromium plating or non-electrolyte nickel may be applied to the pulleys.

Also, the drive blocks 4 may be made of ferric alloy or high tension aluminum alloy instead of the material specified in the first embodiment. It is, however, necessary to subject sliding portions to surface hardening treatments and surface grinding process. In the foregoing embodiments, the tension wire 5 is made of a piano wire. However, high tension fibers such as carbon fibers, Kebler fibers or complex fibers including such fibers may be used for the tension wire 5. Namely, any material that has a high tension resistance and a flexibility may be used as the tension wire. Further, since the rubber belt 6 needs a tension force, the belt may be made of rubber material containing the carbon fibers and high tension fibers. With respect to the form of the belt, any belt may be used which has a shape having a large frictional surface and enabling the winding radius to be small.

As described above, according to the present invention, since the forces applied to the belt and the drive blocks for transmitting the rotational torque of the pulley to the belt may be reduced, the durability of the belt and the drive torque transmission parts for transmitting the drive torque to the belt may be enhanced. This is difficult to be solved in the prior art.

An unnecessary force for moving the movable pulley is eliminated and the belt and pulley assembly may be used in an energy saving manner.

Also, since the drive block body and the guide members may be made independently of each other, it is possible to enhance the respective working or machining precisions, and it is possible to make uniform the stresses applied to the slits of the pulley and the drive block. Furthermore, the material may be suitably selected in response to the stresses that are changed in accordance with an operating condition.

Also, since the frictional force between parts of the guide members inserted into the slits and the slit inner walls may be reduced, the radial movement of the drive blocks in accordance with the pulley movement may be further smoothly carried out.

What is claimed is:

1. An automotive infinite transmission having an input pulley, an output pulley, and belt means entrained around said input and output pulleys for transmitting a rotational torque from said input pulley to said output pulley, an effective diameter of each of said input and output pulleys being variable for changing continuously a transmission ratio, each of said input and output pulleys comprising:

a fixed pulley member fixedly mounted on a rotary shaft and having a tapered pulley surface;

a movable pulley member mounted on said rotary shaft for movement axially of said rotary shaft and having a tapered pulley surface, said pulley surface of said movable pulley member cooperating with said pulley surface of said fixed pulley member to define an annular groove having a generally V-shaped cross-sectional, each of said pulley surfaces of the respective fixed movable pulley members being in the form of a polygonal truncated cone;

actuator means for axially moving said movable member toward and away from said fixed pulley member;

a plurality of generally radially extending slits formed in each of said pulley surface of said fixed pulley member and said pulley surface of said movable pulley member;

a plurality of drive blocks disposed circumferentially along said annular groove between said pulley surface of said fixed pulley member and said pulley surface of said movable pulley member, said drive blocks being in sliding contact with the respective pulley surfaces of said fixed and movable pulley members and being moved radially along said slits when said movable pulley member is moved toward and away from said fixed pulley member by said actuator means;

means for reducing a frictional force between said drive blocks and said pulley surface of said fixed pulley member and a frictional force between said drive blocks and said pulley surface of said movable pulley member;

means for biasing said drive blocks radially inwardly against a centrifugal force applied to said drive blocks when said fixed and movable pulley members are rotated; and said drive blocks each having a radially outward surface with which said belt means is in frictional contact.

2. The infinite transmission according to claim 1, including:

means mounted on each of said drive blocks for movement therewith and engaging corresponding at least one of said slits in said fixed pulley member and corresponding at least one of said slits in said movable pulley member, for guiding the movement of the drive block along the corresponding slits, said guide means being separate from the drive block.

3. The infinite transmission according to claim 2, wherein said guide means is in the form of a column having a generally circular cross-section.

4. The infinite transmission according to claim 1, including:

groove means provided in one of said radially outward surface of each of said drive blocks and said belt means; and projection means provided in the other of said radially outward surface of the drive block and said belt means, for engaging said groove means.

5. The infinite transmission according to claim 4, wherein said projection means has a complementary relationship with said groove means and a generaly V-shaped cross-section, and said projection means and said groove means extend substantially in parallel to a running direction of said belt means.

* * * * *